United States Patent Office 3,008,901
Patented Nov. 14, 1961

3,008,901
PREPARATION OF STABILIZED FLUID
SILICONE COMPOSITIONS
Hayward R. Baker, Silver Spring, Md., Curtis R. Singleterry, Potomac Valley, Va., and Harold Ravner, Accokeek, Md., assignors to the United States of America as represented by the Secretary of the Navy
No Drawing. Filed July 1, 1960, Ser. No. 40,486
4 Claims. (Cl. 252—49.7)
(Granted under Title 35, U.S. Code (1952), sec. 266)

The invention described herein may be manufactured and used by or for the Government of the United States of America for governmental purposes without the payment of any royalties thereon or therefor.

This invention relates to fluid polysiloxanes, more particularly to a method of stabilizing the same for the preparation of new fluid silicone compositions.

Fluid polysiloxanes with which the present invention is concerned are liquid methyl- and methylphenylpolysiloxanes and liquid methylchlorophenylpolysiloxanes which contain up to about 15 mol percent chlorine, i.e., liquid linear polymers in which at least some of the siloxy units contain methyl groups and the siloxane chains are stoppered with trimethylsilyl or triphenylsilyl end groups. They are silicone oils of low pour point and useful as lubricants, but critically limited in such application by susceptibility to oxidation at elevated temperatures in the region above 200 and below 300° C. in the presence of air. Once oxidation has been initiated therein, gelation of the fluids will take place and continue at such temperatures until, eventually, within a relatively short period of time, they have been transformed to rubbery gels. Silicone oil which has been converted to a rubbery gel will deprive the bearing of the essential liquid phase and hamper relubrication.

We have found that fluid silicone compositions which are stable to oxidation and useful as lubricants at temperatures in the range of 200 to 325° C. when employed in the manner hereinafter described can be prepared by the method of our invention hereinafter described, from liquid polysiloxanes as defined above which contain a small amount of hydrogen bonded directly to silicon, i.e., they contain one or more silicon hydride (—SiH) groups. The content of such hydrogen in the liquid polysiloxanes may range from .0003% by weight up to that which will not cause gelation of the polysiloxanes on processing of the same by the method of our invention herein described which, stated numerically, is an amount less than .034% by weight. A preferred range for the hydrogen content is from .0003 to about .017% by weight.

The liquid polysiloxanes may individually contain the hydrogen and the amount thereof as described above or, where such is not present, the same may be supplied thereto by blending those which are deficient in such hydrogen with proportions of one or more of the liquid polysiloxanes which are relatively rich in such hydrogen, containing more than .0003% up to 1.67% by weight thereof, to provide blends of the liquid polysiloxanes in which the amount of such hydrogen is within the range set forth above.

The new fluid silicone compositions obtainable by the method of the invention have a low pour point, a good viscosity-temperature coefficient and are stable, non-gelling lubricants at elevated temperatures in the range of 200 to 325° C. when used as thin films in air, or in systems which are provided with ventilation adequate to remove or sweep out vapors arising from the heated fluid compositions, such as a stream of air or of nitrogen flowing over the surface of the fluid compositions.

In the practice of the method of our invention, the liquid polysiloxanes or blends of liquid polysiloxanes which contain hydrogen bonded directly to silicon in an amount as defined above are added to a solution of disalicylalpropylenediamine-cerium chelate and disalicylalpropylenediamine in a volatile aromatic hydrocarbon solvent, such as benzene, toluene or xylene, etc., in which the cerium chelate is present in an amount which may be from about 0.2 to 0.5% by weight on the liquid polysiloxanes to be treated and the disalicylalpropylenediamine in an amount which may range from about two to tenfold the weight of the cerium chelate. A suitable volume of the solvent for the chelate and diamine is approximately that of the liquid to be treated, although it may also be somewhat greater or less. A preferred solvent is xylene. The combined fluids are agitated to form an intimate mixture which is heated at a temperature from about 280 to 290° C., preferably at 285° C., while bubbling an oxygen-inert gas mixture of from about 20 to 60% oxygen by volume thereinto until the initial brown color of the fluid mixture has given place to a straw- to red-amber color in the finished fluid. The rate of flow of the oxygen-inert gas mixture into the fluid mixture is so regulated as to sweep away the vapors from the fluid mixture during the processing, for which a minimum rate of flow is about 100 cc. per minute of the oxygen-inert gas mixture per 100 grams of the liquid polysiloxane or silicone oil in the fluid mixture. Higher rates of flow of air or of other oxygen-inert gas mixture can be employed, for example, from 200 to 500 cc. per minute per 100 grams of the liquid polysiloxane to be processed, with acceleration of completion of the processing.

The effect of the processing of the fluid mixture with heat and oxygen is to convert the cerium in the chelate to an oxide of sub-micron particle size with elimination of the organic portion of the chelate and the disalicylalpropylenediamine through oxidation. The volatile solvent is evaporated from the fluid mixture early in the processing. The finished fluid or product of the processing is liquid polysiloxane or silicone oil containing the cerium inhibitor of oxidation and gelation as a colloidal oxide of cerium stabilized in suspension by reaction with the silicone or as a chemically bonded component of a silicone macromolecule.

The gas mixture which is bubbled into the fluid mixture in the processing of the liquid polysiloxanes in accordance with the method of our invention may be air or air enriched with oxygen, an oxygen-nitrogen mixture or a mixture of oxygen with a rare gas, such as neon, argon or helium, etc. The oxygen content of the oxygen-inert gas mixture is not critical and as a practical matter may range from about 20 to 60% by volume.

The time required for processing of the liquid polysiloxanes by the method of our invention will vary with the concentration of oxygen in the gas mixture which is bubbled into the fluid mixture. With air as the oxygen-inert gas mixture, the time required for processing will be from about 48 to 72 hours, and is accompanied with loss of about one-third of the liquid polysiloxane by evaporation. The processing time and loss of silicone oil can be reduced through the use of oxygen-inert gas mixtures of higher oxygen content, for example, oxygen enriched air of 50% oxygen by volume and oxygen-nitrogen mixtures of 40 to 60% oxygen by volume. Reduction in processing time and in loss of liquid polysiloxane can also be had by starting with liquid polysiloxanes which have been stripped of the more volatile fractions, for example, the pot residue which remains after stripping the liquid silicone in a molecular still. In this latter way, the processing time can be taken down to as low as 20 hours and the loss of liquid polysiloxane to as low as 7% of the volume of the starting stripped silicone oil. If, further, an oxygen-nitrogen gas mixture of 50% oxygen by volume is used in place of air for processing fluid mixtures in which the liquid polysiloxane is one which has been stripped of the more volatile fractions in a molecular still, the processing time can be still further reduced, in some instances to less than 8 hours. The time requirement for the processing can also be reduced by increasing the rate of flow of air or of other oxygen-inert gas mixture into the fluid mixture.

The cerium chelate employed in processing the liquid polysiloxanes in accordance with the method of the invention is a complex in which one atom of cerium is bound to the residue of two molecules of disalicylalpropylenediamine and can be prepared by reacting cerium toluate, which may be cerous toluate

$$Ce(CH_3C_4H_6COO)_3$$

or basic ceric toluate, $Ce(CH_3C_4H_6COO)_2(OH)_2$, with an equivalent reacting proportion of disalicylalpropylenediamine in a suitable diluent such as xylene. The reaction forming the chelate can be carried out by heating the reactants to boiling with occasional agitation to insure thorough mixing and is completed within a few minutes, 2 to 5 minutes, after bringing to boil. The cerium complex has a characteristic red color. In preparing the cerium complex, an excess of disalicylalpropylenediamine over the equivalent reacting proportion is used whereby the resultant reaction mixture is a solution in xylene of the cerium complex and of from about 2 to 10 parts by weight of disalicylalpropylenediamine per one part by weight of the cerium chelate.

The method of the invention is further illustrated by the following specific examples of the preparation of new fluid silicon compositions. In these examples, the cerium chelate was prepared as above and with the use of an excess of the disalicylalpropylenediamine over the equivalent reacting proportion for forming the chelate so as to provide a treating reagent which was the cerium chelate and disalicylalpropylenediamine in xylene. The liquid polysiloxane or polysiloxane blend containing hydrogen as above defined was added to the hot freshly prepared xylene solution of the cerium chelate and the diamine in a glass flask and the mixture shaken occasionally to ensure a thorough mixing of the fluids. The flask containing the fluid mixture was placed immediately after the mixing of the fluids in a forced draft convection oven (not a circulating oven) operating at 285±5° C. and heated at this temperature while bubbling air into the fluid mixture at a rate in which the volume per minute was equal to the volume of the liquid polysiloxane or blend being processed. The xylene was removed from the fluid mixture by evaporation during the processing. The finished fluid had an amber color in each instance.

*Example 1*

The fluid mixture processed was from the addition of 150 grams of methylphenylpolysiloxane DC510-50 cs. of light (about 10 mol percent phenylation to 150 ml. of a hot xylene solution of the cerium chelate and disalicylalpropylenediamine in which the weight ratio of the chelate to the diamine was about 1 to 6 and which was prepared from a reactant mixture of 0.15 gram cerous toluate and 1.35 grams disalicylalpropylenediamine. Air was bubbled into the heated fluid mixture at the rate of 150 ml./min. for 96 hours. Volume loss of silicone oil was 24.7%.

*Example 2*

The fluid mixture processed was from the addition of a blend of 100 grams of dimethylpolysiloxane (DC 200-50 cs.) with 0.5 gram of dimethylsilicone resin (DC 1107) containing 1.67% by weight hydrogen bonded directly to silicone to 100 ml. of a hot xylene solution of the cerium chelate and disalicylalpropylenediamine in which the weight ratio of the chelate to the diamine was about 1 to 2.4 and which was prepared from a reactant mixture of 0.2 gram ceric toluate and 1 gram of disalicylalpropylenediamine. Air was bubbled into the heated fluid mixture at the rate of 100 ml./min. for 72 hours. Volume loss of silicone oil was 30.1%.

*Example 3*

The fluid mixture processed was from the addition of 100 grams of the methylphenylpolysiloxane as used in Example 1 to 100 ml. of a hot xylene solution of the cerium chelate and disalicylalpropylenediamine in which the weight ratio of the chelate to the diamine was about 1 to 4.3 and which was prepared from a reactant mixture of 0.1 gram of basic ceric toluate and 0.9 gram of disalicylalpropylenediamine. Air was bubbled into the heated fluid mixture at the rate of 100 ml./min. for 72 hours. Volume loss of silicon oil was 22.6%.

*Example 4*

The fluid mixture processed was the same as that of Example 2 with the exception of the use of an equal weight of the methylphenylpolysiloxane DC 510-50 cs. in place of the dimethylpolysiloxane. Air was bubbled into the heated fluid mixture at the rate of 100 ml./min. for 48 hours. Volume loss of silicone oil was 18.4%.

*Example 5*

The fluid mixture processed was from the addition of 100 grams of methylphenylpolysiloxane DC 550-100 cs. of medium (about 25%) phenylation to 100 ml. of a hot xylene solution of the cerium chelate and disalicylalpropylenediamine in which the weight ratio of the chelate to the diamine was about 4.9 and which was prepared from a reactant mixture of 0.1 gram cerous toluate and 0.9 gram disalicylalpropylenediamine. Air was bubbled into the heated fluid mixture at the rate of 100 ml./min. for 72 hours. Volume loss of silicone oil was 18.2%.

*Example 6*

The fluid mixture processed and the processing was the same as that of Example 3 with the exception of the use of an equal weight of methylphenylpolysiloxane DC 710-500 cs. of high (about 45 mole percent) phenylation in place of the DC 510-50 cs. silicone oil. The bubbling in of air was for 96 hours. Volume loss of silicone oil was 26.2%.

*Example 7*

The methylphenylpolysiloxane DC 510-50 cs. was stripped of light fractions in a molecular still and 100 grams of the pot residue was used as the silicone oil in a fluid mixture otherwise the same as that of Example 5. Air was bubbled into the heated fluid mixture at the rate of 100 ml./min. for 24 hours. Volume loss of silicone oil was 6.2%.

*Example 8*

The fluid mixture processed and the processing was the same as that of Example 2 with the exception of the use of an equal weight of methylmonochlorophenylpolysiloxane DC F-60-60 cs. The volume loss of silicone oil was 19%.

The efficacy of the method of our invention to impart stability to oxidation and gelation in the liquid polysiloxanes as defined above is demonstrated by tests which were conducted on the new stabilized fluid silicone compositions. Testing procedures employed for evaluating stability of the fluid compositions from the method of our invention are denominated herein as the thin film test, the aeration test, and the ventilation test.

In the thin film test, a 0.15 gram sample of the silicone oil composition and of the control (untreated silicone oil) are spread over the bottom of separate 5 to 6 cm. diameter Petri dishes of molded borosilicate glass and exposed to heating at test temperature in a convection oven. Oven temperature is maintained within 1° C. with a recording controller. The test samples are placed symmetrically on a half-inch thick aluminum plate to assure temperature equivalence. This plate is manually rotated at regular intervals to expose each sample in turn to conditions at a given point in the oven. Volatilization loss is determined by periodic weighing of the samples and the elapsed time to gelation recorded. This test exposes the samples to high temperature under ready access of oxygen (air) with continuous rapid removal of volatile products by convective action and oven ventilation.

In the aeration test a 15 gram sample of the silicone oil composition and of the control (untreated silicone oil) are placed in borosilicate glass tubes 1.6 by 46 cm., of which the lower 17 cm. is inserted in an electrically heated aluminum block. The surface of the liquid is at a level of one or two cm. below the surface of the block at the test temperature. Clean dry air is bubbled into the liquid at the rate of 50 cc./min. and the elasped time to gelation recorded.

The ventilation test is a modification of the aeration test in which the space above the sample in the tubes is purged by flowing clean dry air thereinto at the rate of 50 cc./min., the air being introduced just above the liquid surface and the elapsed time to gelation recorded.

The results of the thin film test at 300° C. on the inhibited silicone oil compositions of the above examples and the control (untreated silicone oil) are shown in Table 1, below:

TABLE 1

| Composition | Hours to Gelation | Control—Hours to Gelation |
|---|---|---|
| Example 1 | 1,032 | 2 |
| Example 2 | 480 | 1 |
| Example 3 | >384 | 2 |
| Example 4 | >720 | 1 |
| Example 5 | 504 | 63 |
| Example 6 | 264 | 91 |
| Example 7 | >720 | 3 |
| Example 8 | 192 | 4 |

The results of the aeration and ventilation tests at 300° C. on the fluid silicone compositions of Examples 1 and 3 are contained in Table 2 below:

TABLE 2

| | Aeration—Hours to Gelation | | Ventilation—Hours to Gelation | |
|---|---|---|---|---|
| | Composition | Control | Composition | Control |
| Example 1 | >1,780 | 20 | 1,288 | 114 |
| Example 3 | >1,200 | 20 | 720 | 114 |

The liquid polysiloxanes processed in the above examples were commercial products containing hydrogen directly bonded to silicon in an amount within the above-defined ranges with the exception of the dimethyl- and the methyl monochlorophenylpolysiloxanes which were deficient in this respect.

While the invention has been described herein with reference to certain specific embodiments thereof, such are intended primarily by way of illustration and not in limitation except as may be defined in the appended claims.

What is claimed is:
1. A method of stabilizing liquid polysiloxanes of the group consisting of liquid methyl-, methylphenyl and methylmonochorophenylpolysiloxanes which comprises forming a fluid mixture of at least one member of said group of liquid polysiloxanes with which is present hydrogen bonded directly to silicon to the extent of from .0003 to less than about .034% by weight with a solution in a volatile aromatic hydrocarbon solvent of from about 0.2 to 0.5% by weight thereon of disalicylalpropylenediamine-cerium chelate and an amount of disalicylalpropylenediamine which is from about two to ten times the weight of said cerium chelate, bubbling an oxygen-inert gas mixture containing from about 20 to 60% oxygen by volume into said fluid mixture while heating it a temperature of from about 280 to 290° C. and sweeping resulting vapors from the vicinity thereof until the resulting fluid is from a straw- to red-amber in color.

2. A method as defined in claim 1, wherein the oxygen-inert gas mixture is air.

3. A method of stabilizing liquid polysiloxanes of the group consisting of liquid methyl-, methylphenyl- and methylmonochlorophenylpolysiloxanes which comprises blending a member of said group of liquid polysiloxanes which does not contain hydrogen bonded directly to silicon to the extent of .0003% by weight with an amount of a member of said group of liquid polysiloxanes which contains hydrogen bonded directly to silicon in amount greater than .0003 but not greater than 1.67% by weight such that the resulting blend of liquid polysiloxanes has a content of said hydrogen of from .0003 to less than about .034% by weight, intimately mixing said blended liquid polysiloxanes with a solution in a volatile aromatic hydrocarbon solvent of from about 0.2 to 0.5% by weight thereof of disalicylalpropylenediamine-cerium chelate and an amount of disalicylalpropylenediamine which is from about two to ten times the weight of said cerium chelate, bubbling an oxygen-inert gas mixture containing from about 20 to 60% oxygen by volume into the resulting fluid mixture while heating it at a temperature of from about 280 to 290° C. and sweeping resulting vapors from the vicinity thereof until the resulting fluid is from a straw- to red-amber in color.

4. A method as defined in claim 3, wherein the oxygen-inert gas mixture is air.

References Cited in the file of this patent
UNITED STATES PATENTS
2,465,296    Swiss _____ Mar. 22, 1949